US009049532B2

(12) United States Patent
Kim et al.

(10) Patent No.: US 9,049,532 B2
(45) Date of Patent: Jun. 2, 2015

(54) APPARATUS AND METHOD FOR SEPARATING SOUND SOURCE

(75) Inventors: Min Je Kim, Daegu (KR); Seung Kwon Beack, Seoul (KR); In Seon Jang, Daejeon (KR); Tae Jin Lee, Daejeon (KR); Kyeong Ok Kang, Daejeon (KR)

(73) Assignee: Electronics and Telecommunications Research Instittute, Daejeon (KR)

( * ) Notice: Subject to any disclaimer, the term of this patent is extended or adjusted under 35 U.S.C. 154(b) by 786 days.

(21) Appl. No.: 13/276,974

(22) Filed: Oct. 19, 2011

(65) Prior Publication Data

US 2012/0093341 A1 Apr. 19, 2012

(30) Foreign Application Priority Data

Oct. 19, 2010 (KR) ........................ 10-2010-0102119
Feb. 25, 2011 (KR) ........................ 10-2011-0017283

(51) Int. Cl.
*G06F 17/00* (2006.01)
*H04S 7/00* (2006.01)
*G10L 19/008* (2013.01)

(52) U.S. Cl.
CPC ................. *H04S 7/30* (2013.01); *G10L 19/008* (2013.01); *G10H 2210/056* (2013.01)

(58) Field of Classification Search
CPC ........... G10H 2210/056; G10L 19/008; G10L 21/0264; G10L 21/0272
USPC ............................................................ 700/94
See application file for complete search history.

(56) References Cited

U.S. PATENT DOCUMENTS

2010/0158271 A1 6/2010 Park et al.
2011/0075851 A1 * 3/2011 LeBoeuf et al. ................ 381/56

OTHER PUBLICATIONS

Mandel et al., Model-Based Expectation-Maximization Source Separation and Localization, Nov. 2009, IEEE Transactions on Audio, Speech, and Language Processing, vol. 17, No. 8.*

* cited by examiner

*Primary Examiner* — Joseph Saunders, Jr.
(74) *Attorney, Agent, or Firm* — Nelson Mullins Riley & Scarborough LLP; Anthony A. Laurentano, Esq.

(57) ABSTRACT

Disclosed are an apparatus and a method for separating sound sources capable of learning distributions of corresponding sound sources based on the assumption that specific sound sources have specific distributions based on interchannel correlation parameter in audio signals providing space perception through a plurality of channels to separate an amount corresponding to energy contribution of the corresponding sound sources from mixture signals. Exemplary embodiments of the present invention can more precisely predict the channel distributions of the specific sound sources included in the input mixture signals and more accurately separate sound sources than a method for separating a sound source based on the channel according to the related art, under conditions that general channel distribution information of the specific sound sources are approximately modeled.

18 Claims, 4 Drawing Sheets

APPARATUS AND METHOD FOR SEPARATING SOUND SOURCE

CROSS-REFERENCE TO RELATED APPLICATIONS

This application claims priority to and the benefit of Korean Patent Application Nos. 10-2010-0102119 and 10-2011-0017283 filed in the Korean Intellectual Property Office on Oct. 19, 2010 and Feb. 25, 2011, the entire contents of which are incorporated herein by reference.

TECHNICAL FIELD

The present invention relates to an apparatus and a method for separating sound sources. More particularly, the present invention relates to an apparatus and a method for separating targeted sound source signals from audio signals provided through a plurality of channels.

BACKGROUND ART

With the development of technologies, a method for separating specific sound sources from mixture signals provided to a plurality of channels in which various sound sources are recorded together has been developed.

However, a technology for separating sound sources based on channel information according to the related art considers a portion of the entire section of mixture signals as specific sound sources or as one not the specific sound sources, based on empirically selected specific values under conditions that channel distribution information on a sound source to be separated is obscure and as a result, noises may occur according to a sudden change in signals and separation may be deteriorated. Therefore, a need exists for a method for implementing softer sound quality and higher separation by more precisely determining the channel information on the specific sound sources in the plurality of channel mixture signals and acquiring energy by a specific ratio in the specific section of the mixture signals based on the determination.

SUMMARY OF THE INVENTION

The present invention has been made in an effort to provide an apparatus and a method for separating sound sources capable of separating a targeted sound source signal from a mixture signal provided through a plurality of channels by learning distributions of the corresponding sound sources based on the assumption that specific sound sources have specific distributions based on correlation parameters between the specific sound sources and the channels.

An exemplary embodiment of the present invention provides an apparatus for separating sound sources, including: a parameter determinator determining parameters associated with interchannel correlation for each sound sources included in receiving multi-channel audio signals; a sound source value calculator using channel distribution values of each sound source by the parameters to estimate at least one mixture model and calculating membership probabilities for each model for each sound source from the estimated mixture models; and a sound source separator separating the sound sources from the multi-channel audio signals based on the membership probabilities for each model of the sound sources by the calculation.

The apparatus for separating sound sources may further include: a parameter acquisition unit acquiring the parameters for the predetermined sound sources; a sound source value estimator estimating the channel distribution values of the corresponding sound sources by using the acquired parameters; and a sound source value reflector reflecting the estimated channel distribution values when estimating the mixture models and when calculating the membership probabilities for each model.

The sound source value calculator may estimate a Gaussian mixture model using the mixture models to calculate the membership probabilities for each model according to expectation maximization. When A is a contribution probability of contributing a first mixture model associated with a selected parameter to all the mixture models, B is a probability of generating a selected data sample by the first mixture model, and C is a sigma operation value for a multiplication value of A and B that use each mixture model as the first mixture model when the mixture model is at least two, the sound source value calculator may calculate a value obtained by dividing a multiplication value of A and B by C as an expectation. The sound source value calculator may perform the expectation maximization using average values of each data sample reflecting the calculated expectations and dispersion values of all the data samples reflecting the calculated expectations and the average values to calculate the membership probabilities for each model. The sound source value calculator may repeatedly perform the expectation maximization until the distribution function is converged by the average values and the dispersion values.

The parameter determinator may include: a signal extractor extracting signals including predetermined sound sources by transforming multi-channel audio signals from a time domain into a frequency domain or extracting the signals including the predetermined sound sources by filtering the multi-channel audio signals; and a matrix calculator configuring extracted signals in a spectrogram matrix and determining parameters by calculating the spectrogram matrix for elements having specified frames or frequency values.

The sound source separator may separate the sound sources from the multi-channel audio signals based on the channel distribution values.

The sound source value estimator may include: a parameter calculator calculating the average values of each parameter on a normal distribution predicted by the acquired parameters and calculating dispersion values or standard deviation values of each parameter; and a channel distribution value estimator estimating the channel distribution values of the corresponding sound sources using values obtained for each parameter by the calculation.

The sound source value reflector may reflect the prestored channel distribution values when the estimated channel distribution values are absent.

Another exemplary embodiment of the present invention provides a method for separating sound sources, including: determining parameters associated with interchannel correlation for each sound sources included in receiving multi-channel audio signals; using channel distribution values of each sound source by the parameters to estimate at least one mixture model and calculating membership probabilities for each model for each sound source from the estimated mixture models; and separating the sound sources from the multi-channel audio signals based on the membership probabilities for each model of the sound sources by the calculation.

The method for separating sound sources may further include: prior to the acquiring of the parameters, acquiring the parameters for the predetermined sound sources; estimating the channel distribution values of the corresponding sound sources by using the acquired parameters; and reflecting the estimated channel distribution values when estimating the mixture models and when calculating the membership probabilities for each model.

The calculating of the sound source values may estimate a Gaussian mixture model using the mixture models to calculate the member probabilities for each model according to expectation maximization. When A is a contribution probability of contributing a first mixture model associated with a selected parameter to all the mixture models, B is a probability of generating a selected data sample by the first mixture model, and C is a sigma operation value for a multiplication value of A and B that use each mixture model as the first mixture model when the mixture model is at least two, the calculating of the sound source values may calculate a value obtained by dividing a multiplication value of A and B by C as an expectation. The calculating of the sound source values may perform the expectation maximization using average values of each data sample reflecting the calculated expectations and dispersion values of all the data samples reflecting the calculated expectations and the average values to calculate the membership probabilities for each model. The calculating of the sound source values may repeatedly perform the expectation maximization until the distribution function is converged by the average values and the dispersion values.

The determining of the parameters may include: extracting signals including predetermined sound sources by transforming multi-channel audio signals from a time domain into a frequency domain or extracting the signals including the predetermined sound sources by filtering the multi-channel audio signals; and configuring extracted signals in a spectrogram matrix and determining parameters by calculating the spectrogram matrix for elements having specified frames or frequency values.

The separating of the sound sources may separate the sound sources from the multi-channel audio signals based on the channel distribution values.

The estimating of the sound source values may include: calculating the average values of each parameter on a normal distribution predicted by the acquired parameters and calculating dispersion values or standard deviation values of each parameter; and estimating the channel distribution values of the corresponding sound sources using values obtained for each parameter by the calculation.

The reflecting of the sound source values may reflect the prestored channel distribution values when the estimated channel distribution values are absent.

According to the exemplary embodiments of the present invention, it is possible to more precisely separate the sound source than the method for separating sound sources based on the channel according to the related art and provide the high-quality results to the users, by more precisely predicting the channel distributions of the specific sound sources included in the input mixture signals under the conditions that the general channel distribution information of the specific sound sources is approximately modeled.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
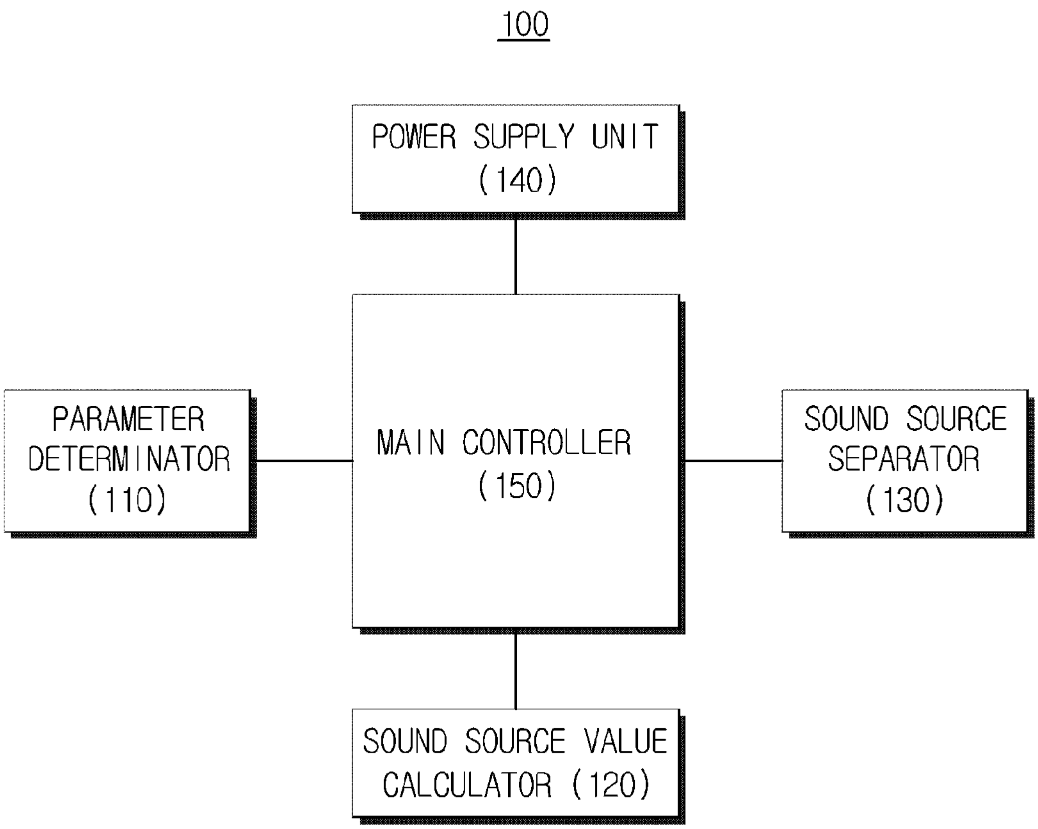
FIG. 1 is a block diagram schematically showing an apparatus for separating sound sources according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a block diagram schematically showing an apparatus for separating sound sources according to an exemplary embodiment of the present invention. FIG. 2 is a block diagram schematically showing an inner configuration and an additional configuration of the apparatus for separating sound sources according to an exemplary embodiment of the present invention. Hereinafter, exemplary embodiments of the present invention will be described with reference to FIGS. 1 and 2.

Referring to FIG. 1, an apparatus 100 for separating sound sources includes a parameter determinator 110, a sound source value calculator 120, a sound source separator 130, a power supply unit 140, and a main controller 150.

The apparatus 100 for separating sound sources is targeted to separate signals configured of only specific sound sources from a plurality of channel mixture signals. Among various methods that may be used for the separation, when the specific sound sources are present over several channels, the specific sound sources are more precisely separated by adaptively predicting the distribution range of the specific sound sources according to the input mixture signals.

The parameter determinator 110 serves to determine parameters associated with the interchannel correlation for each sound source included in the receiving multi-channel audio signals. The parameter determinator 110 may obtain an interchannel level difference (ILD) or an interchannel phase difference (IPD) that is a parameter representing the correlation information between the plurality of channels.

Figure 3:
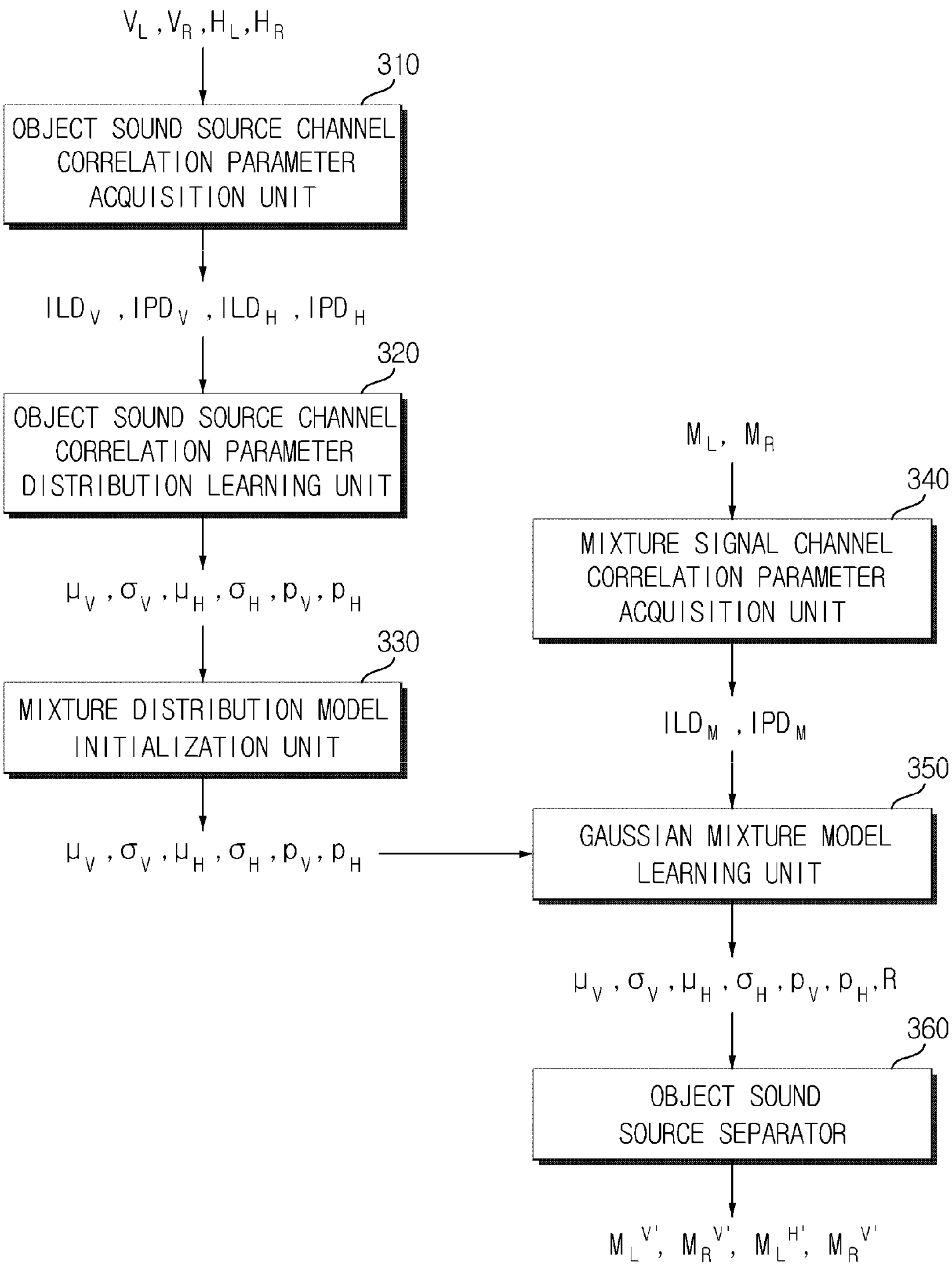
FIG. 3 is an exemplified diagram of the apparatus for separating sound sources according to an exemplary embodiment of the present invention.

The parameter determinator 110 is the same concept as a mixture signal channel correlation parameter acquiring unit 340 of FIG. 3.

Figure 2A:
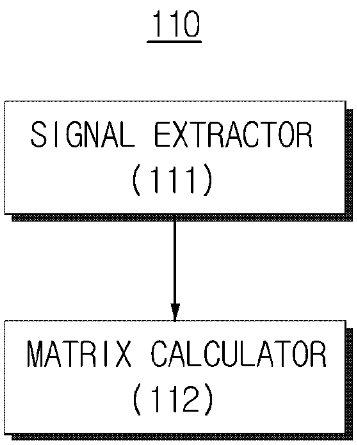
FIG. 2 is a block diagram schematically showing an inner configuration and an additional configuration of the apparatus for separating sound sources according to an exemplary embodiment of the present invention.

The parameter determinator 110 may include a signal extractor 111 and a matrix calculator 112 as shown in FIG. 2A.

The signal extractor 111 serves to extract signals including predetermined sound sources by transforming multi-channel audio signals from a time domain into a frequency domain or extract the signals including the predetermined sound sources by filtering the multi-channel audio signals.

The signal extractor 111 may use the Fourier transform (FT), in particular, the short time Fourier transform (STFT), when transforming the time domain into the frequency domain. In addition, the signal extractor 111 may use a band pass filter (BPF) so as to obtain a subband signal when audio signals are filtered.

The matrix calculator 112 serves to configure extracted signals in a spectrogram matrix and determine parameters by calculating the spectrogram matrix for elements having specified frames or frequency values.

The sound value calculator 120 serves to estimate at least one mixture model by using channel distribution values of each sound source by the parameters and calculate membership probabilities corresponding to each model for each sound source from the estimated mixture model. The sound source value calculator 120 is the same concept as a mixture model learning unit 350 of FIG. 3.

The sound source value calculator 120 estimates a Gaussian mixture model using the mixture model to calculate the membership probabilities for each model according to expectation maximization.

The source sound value calculator 120 calculates a value obtained by dividing a multiplication value of A and B by C as an expectation. In this case, A is a contribution probability of contributing a first mixture model associated with a selected parameter to all the mixture models, B is a probability of generating a selected data sample by the first mixture model, and C is a sigma operation value for a multiplication value of A and B that use each mixture model as the first mixture model when the mixture model is at least two. The function of the sound source value calculator 120 will be described in more detail with reference to Equation 1. The definition of the data sample will also be described in more detail with reference to Equation 1.

The sound source value calculator 120 performs the expectation maximization using average values of each data sample reflecting the calculated expectations and dispersion values of all the data samples reflecting the calculated expectations and the average values to calculate the membership probabilities for each model. Preferably, the sound source value calculator 120 repeatedly performs the expectation maximization until the distribution function is converged by the average values and the dispersion values. The function of the sound source value calculator 120 will be described in more detail with reference to Equation 2.

The sound source separator 130 serves to separate the sound sources from the multi-channel audio signals based on the membership probabilities for each model of the sound sources by the calculation. The sound source separator 130 is the same concept as an object sound source separator 360 of FIG. 3.

Meanwhile, the sound source separator 130 may separate the sound sources from the multi-channel audio signals based on the channel distribution values. In this case, the sound source separator 130 is the same concept as an auxiliary separator to be described below.

The power supply unit 140 serves to supply power to each component configuring the apparatus 100 for separating sound sources.

The main controller 150 serves to control all the operations of each component configuring the apparatus 100 for separating sound sources.

Figure 2B:
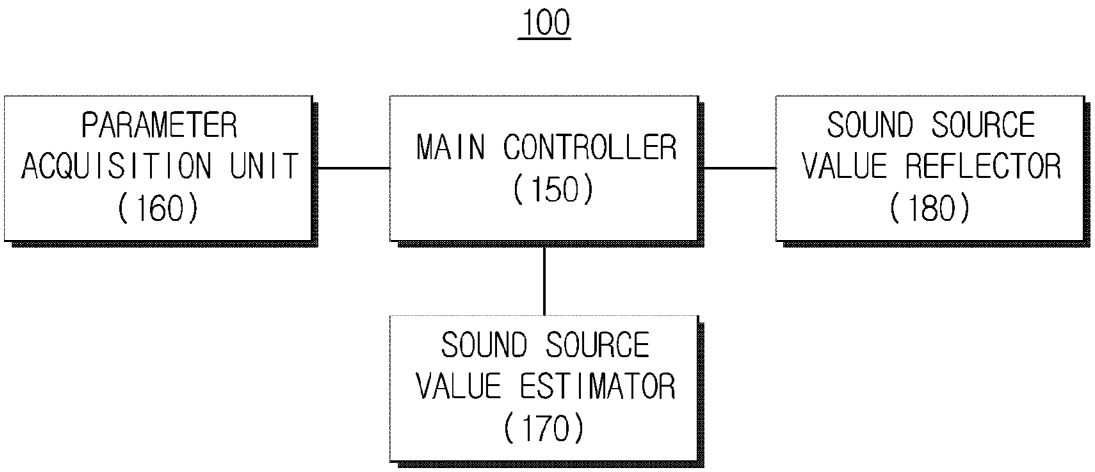

The apparatus 100 for separating sound sources may further include a parameter acquisition unit 160, a sound source value estimator 170, and a sound source value reflector 180 as shown in FIG. 2B.

The parameter acquisition unit 160 serves to acquire parameters for the predetermined sound sources. The apparatus 100 for separating sound sources is to effectively separate the targeted sound sources from the mixture signals. Therefore, the predetermined sound source used when the parameter acquisition unit 160 acquires the parameters means the targeted sound sources. The parameter acquisition unit 160 is the same concept as an object sound source channel correlation parameter acquisition unit 310 of FIG. 3.

The sound source value estimator 170 uses the acquired parameters to estimate the channel distribution values of the corresponding sound source. The sound source value estimator 170 is the same concept as an object sound source channel correlation parameter distribution learning unit 320 of FIG. 3.

Figure 2C:
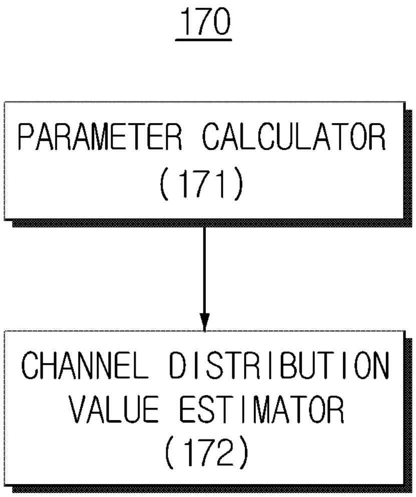

The sound source value estimator 170 may include a parameter calculator 171 and a channel distribution value estimator 172 as shown in FIG. 2C.

The parameter calculator 171 calculates the average values of each parameter on a normal distribution predicted by the acquired parameters and serves to calculate dispersion values or standard deviation values of each parameter.

The channel distribution value estimator 172 serves to estimate the channel distribution values of the corresponding sound sources using values obtained for each parameter by the calculation. As described above, the values obtained for each parameter mean the average values and the dispersion values of each parameter or mean the average values and the standard deviation values of each parameter.

Meanwhile, the parameter calculator 171 may measure the contribution probability of the mixture signals for each normal distribution for each parameter, that is, the degree of contributing each distribution to mixing the sound sources. Herein, the values may also be used when the channel distribution value estimator 172 estimates the channel distribution values of the sound sources.

The sound source value reflector 180 serves to reflect the estimated channel distribution values when estimating the mixture models and the membership probabilities for each model. The sound source value reflector 180 may reflect the prestored channel distribution values when the estimated channel distribution values are absent. The sound source reflector 180 is the same concept as the mixture model initialization unit 330 of FIG. 3.

Next, the apparatus 100 for separating sound sources will be described with reference to an example. FIG. 3 is an exemplified diagram of the apparatus 100 for separating sound sources according to the exemplary embodiment of the present invention. The following description will be made with reference to FIG. 3.

In the exemplary embodiment of the present invention, the apparatus for separating sound sources is an apparatus that may learn the distributions of the corresponding sound sources based on the assumption that the specific sound sources have the specific distributions based on the interchannel correlation parameter in the audio signals providing the space perception through the plurality of channels to separate an amount corresponding to the energy contribution of the corresponding sound sources from the mixture signals. The apparatus for separating sound sources using the channel distributions of the sound sources may include the object sound source channel correlation parameter acquisition unit 310, the object sound source channel correlation parameter distribution learning unit 320, the mixture model initialization unit 330, the mixture signal channel correlation parameter acquisition unit 340, the mixture model learning unit 350, and the object sound source separator 360. Hereinafter, the object sound source channel correlation parameter acquisition unit 310, the object sound source channel correlation parameter distribution learning unit 320, the mixture model initialization unit 330, the mixture signal channel correlation parameter acquisition unit 340, the mixture model learning unit 350, and the object sound source separator 360 are each abbreviated by the first parameter acquisition unit 310, the first learning unit 320, the initialization unit 330, the second parameter acquisition unit 340, the second learning unit 350, and the separator 360.

The first parameter acquisition unit 310 serves to acquire the general channel correlation parameters of the separation object sound sources. The first learning unit 320 serves to learn the distributions of the acquired channel correlation parameters. The second parameter acquisition unit 340 serves to acquire the channel correlation parameters of the mixture signals. The initialization unit 330 serves to use the channel distribution values of the general sound sources previously learned in the first learning unit 320 to increase the performance of the mixture model learning. The second learning unit 350 serves to represent the channel correlation parameters of the mixture signals using the mixture model. The separator 360 serves to use the membership probabilities for each model of the learned mixture models as a component ratio to separate the specific sound sources within the mixture signals.

Meanwhile, the apparatus for separating sound sources may further include the auxiliary separator. The auxiliary separator serves to uses the distributions of the generally learned specific sound sources as they are to separate the specific sound sources within the mixture signals.

In the exemplary embodiment of the present invention according to FIG. 3, it is first assumed that two types of stereo sound sources V and H subjected to the time-frequency domain transform process such as the short time Fourier transform (STFT), or the like, have different channel parameter distributions. However, the types of the sound sources having different distributions may be more diverse and the effect of the present invention may also be applied to the input signals of multi-channels more than the stereo channels as it is. In addition, the V and H that are the object sound sources for learning may be subband signals that are subjected to a band pass filter (BPF) so as to derive more precise distribution. In this case, the exemplary embodiment according to FIG. 3 is applied to each subband signal and the results are also the results of separating sound sources within the corresponding subbands. The function may be performed by the signal extractor 111 of FIG. 2A.

In the exemplary embodiment of the present invention according to FIG. 3, it is assumed that the first parameter acquisition unit 310 uses the interchannel level difference (ILD) information and the interchannel phase difference (IPD) information as the correlation parameter between the plurality of channels. In some cases, various parameters that may be used to represent the interchannel information such as the interchannel correlation (ICC) information, or the like, may be used. The interchannel correlation parameters are each calculated for one element having specific frames and frequency values when the signal V or H is subjected to the STFT using a complex spectrogram matrix. The function may be performed by the matrix calculator 112 of FIG. 2A.

Each element of the acquired interchannel correlation parameter matrices $ILD_v$, $IPD_v$, $ILD_H$, and $IPD_H$ may be one sample of probability variables having the specific distributions. For example, a multivariate probability variable $X_v$ for the sound source V is a two-dimensional multivariate probability variable having two scalar probability variables $X_{ILDv}$ and $X_{IPDv}$ as elements, an average thereof is μV, and a standard deviation may follow a normal distribution having a $S_v$ value. Similarly, a multivariate probability variable $X_H$ for the sound source H is a two-dimensional multivariate probability variable having two scalar probability variables $X_{ILDh}$ and $X_{IPDh}$ as elements, an average thereof is pH, and a standard deviation may follow a normal distribution having a $S_H$ value. In this case, even though $X_v$ and $X_H$ follow different types of distributions or have the same type of distributions, it may be assumed that the corresponding two sound sources have the different interchannel distributions when averages or standard deviations are different from each other.

The first learning unit 320 uses the acquired channel correlation parameter values for each sound source to decide the predetermined predictive models. For example, when each element of $ILD_v$ and $IPD_v$ is predicted as following the multivariate normal distribution, the channel correlation parameter distributions of the corresponding sound sources may be decided by obtaining the sample average and the sample dispersion (standard deviations) of the corresponding samples. In addition, the mixture signal contribution probabilities $P_v$ and $P_H$ for each distribution may be obtained in advance by measuring the contribution of each distribution to the mixture of the sound sources.

The initialization unit 330 may use the distributions for each sound source included in the mixture signals as initialization values at the time of the prediction by using the distribution definition parameters of each sound source obtained by the above-mentioned manner, for example, the average, the standard deviation, the contribution probability, or the like. In addition, in some cases, in the case when the signals for each sound source for learning are not secured, the initialization value may also be performed based on experience values. In addition, when the initialization is performed using random values, the second learning unit 350 of the exemplary embodiment of the present invention may exert the performance to some degree and perform the sound source separation.

The second parameter acquisition unit 340 means a process of acquiring the predetermined interchannel parameters from the mixture signals. In this case, since the mixture signals are not subjected to the sound source separation, it is possible to acquire the parameters for each element in the mixture signal spectrogram matrix. In addition, the mixture signal input may also be the subband signals via the band pass filter (BPF) so as to precisely derive the distributions. In this case, the exemplary embodiment shown in FIG. 3 is applied to each subband signal and the results are also the results of separating the sound sources within the corresponding subbands. In addition, the mixture signal inputs $M_L$ and $M_R$ may be segment signals configured of only some time periods of an original signal.

It may be assumed that the interchannel correlation parameters of the acquired mixture signals are a type in which at least two distributions initialized by using the distribution definition parameters as being initialized in the initialization unit 330 are mixed. The second learning unit 350 may obtain the membership probabilities for each distribution model that estimates each sample through the expectation maximization that learns the distribution definition parameters from the data samples when it is assumed that there are at least two mixture models. For example, in order to obtain the probabilities of the data samples under the conditions that the plurality of normal distributions are mixed, the expectation maximization may be applied through a Gaussian mixture model (GMM) type. The second learning unit 350 may be updated through the following expectation maximization type when it is assumed that the Gaussian mixture model is a fundamental model. First, a process of obtaining the expectations may be represented by the following Equation 1.

$$r_{jt} = \frac{p(x_t \mid j)p(j)}{\sum_{j=1}^{M} p(x_t \mid j)p(j)} \quad \text{[Equation 1]}$$

In Equation 1, p (j) means the mixture contribution probability that contributes a j-th normal distribution to all the mixture distributions. Probability p (xt|j) means the probability that a t-th data sample $x_t$ is generated by the j-th normal distribution when considering a probability distribution function of the j-th normal distribution.

Therefore, $r_{jt}$ means the probability that the specific data sample $x_t$ starts from the j-th normal distribution. In this case, in the case of the exemplary embodiment of using the ILD and the IPD, the t-th input sample $x_t$ may be defined by vector xt=[$ILD_{M,t}$, $IPD_{M,t}$] that is configured as a pair of t-th input samples of the ILD matrix $ILD_M$ and the IPD matrix $IPD_M$ of the vectored mixture signals.

The maximization process may be represented by the following Equation 2.

$$\mu_j^{new} = \frac{\sum_t r_{jt} x_t}{\sum_t r_{jt}} \quad \text{[Equation 2]}$$

$$\sigma_j^{2new} = \frac{\sum_t r_{jt}(x_t - \mu_j^{new})(x_t - \mu_j^{new})^{\top}}{\sum_t r_{jt}}$$

$$p^{new}(j) = \frac{1}{N}\sum_t r_{jt}$$

The maximization process newly updates the averages and the dispersions that are the distribution parameters of each of the M normal distributions based on the model membership probability $r_{jt}$ for each sample obtained by Equation 1, such that the mixture distribution may represent the data samples better. First, a new average value $\mu_j^{new}$ of the existing j-th normal distribution is an average value of each data sample to which the new membership probability $r_{jt}$ is reflected and a new dispersion value $s_j^{2new}$ is also updated based on the new membership probability $r_{jt}$ and the new average value $\mu_j^{new}$.

Finally, the mixture contribution probability $p^{new}$ (j) is updated through the expectations of the specific model membership probabilities for each data sample. When the distribution function is converged to a predetermined type by repeatedly performing the expectation maximization, the membership degree for each model of each input sample $r_{jt}$ may be secured. In the above description, Σt means a dispersion matrix and T means a matrix transposer. N means the number of data.

Based on the results of the second learning unit 350, the separator 360 may perform the sound source separation based on the membership degrees for each distribution for the data samples having the specific frames and frequency values of the mixture signal spectrogram. For example, for the complex spectrogram samples $M_L$ (i,f) and $M_R$ (i,f) of the mixture signals having a f-th frequency value of the i-th frame, if the probability that the sample configured of the ILD and the IPD of the corresponding positions follows the distribution model of the type such as the sound source V is $r_v$ (i,f), $M_L$ (i,f) and $M_R$ (i,f) recover the left and right channels $M_L^{V'}$ and $M_R^{V'}$ of the sound source V within the mixture signal as follows.

$$M_L^{V'}(i,f)=r_v(i,f)*M_L(i,f)$$

$$M_R^{V'}(i,f)=r_v(i,f)*M_R(i,f)$$

Similarly, the sound source of the type such as the sound source H may be recovered by the following method using a condition that the membership probability value $r_v$ (i,f)+$r_H$ (i,f)=1.

$$M_L^{H'}(i,f)=r_H(i,f)*M_L(i,f)$$

$$M_R^{H}(i,f)=r_H(i,f)*M_R(i,f)$$

In some cases, when the mixture signal input is configured of a consecutive segment configured of only some periods, the results of the second learning unit 350 in the previous segment are used as the initialization value at the time of operating the second learning unit 350 of the next segment, thereby shortening the update process of the Gaussian mixture model learning.

Figure 4:
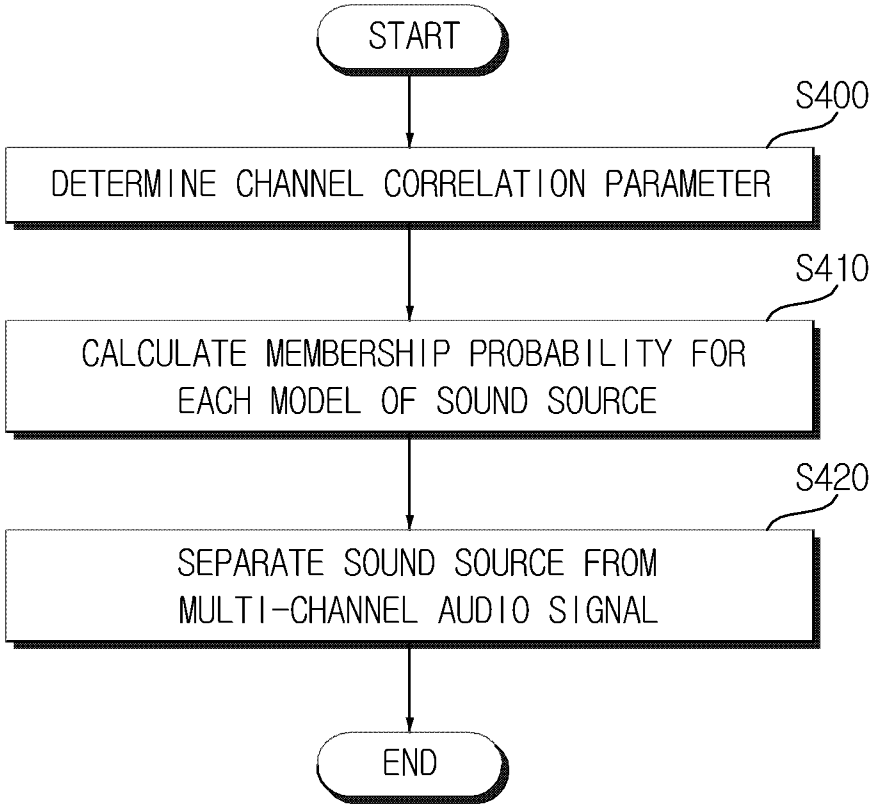
FIG. 4 is a flow chart showing a method for separating sound sources according to an exemplary embodiment of the present invention.

Next, a method for separating sound sources according to the apparatus 100 for separating sound sources will be described. FIG. 4 is a flow chart showing a method for separating a sound source according to the exemplary embodiment of the present invention. The following description will be made with reference to FIG. 4.

First, the parameters associated with the interchannel correlation for each of the sound sources included in the receiving multi-channel audio signals are determined (determining the parameters (S400)).

The determining of the parameters (S400) may be configured to include extracting a signal and calculating a matrix. The extracting of the signal extracts the signals including the predetermined sound sources by transforming the time domain into the frequency domain for the multi-channel audio signals or filters the multi-channel audio signals, thereby extracting the signals including the predetermined sound sources. The calculating of the matrix configures extracted signals in a spectrogram matrix and determines parameters by calculating the spectrogram matrix for elements having specified frames or frequency values.

After the determining of the parameters (S400), at least one mixture model is estimated using the channel distribution values of each sound source by the parameters and the membership probabilities for each model for each sound source are calculated from the estimated mixture models (calculating the sound source values (S410)).

The calculating of the sound source values (S410) calculates the membership probability for each model according to the expectation maximization by estimating the Gaussian mixture model by using the mixture model.

The calculating of the sound source value (S410) calculates a value obtained by dividing the multiplication value of A and B by C as an expectation. In this case, A is a contribution probability of contributing a first mixture model associated with a selected parameter to all the mixture models, B is a probability of generating a selected data sample by the first mixture model, and C is a sigma operation value for a multiplication value of A and B that use each mixture model as the first mixture model when the mixture model is at least two.

The calculating of the sound source values (S410) performs the expectation maximization using average values of each data sample reflecting the calculated expectations and dispersion values of all the data samples reflecting the calculated expectations and the average values to calculate the membership probabilities for each model.

Preferably, the calculating of the sound source values (S410) repeatedly performs the expectation maximization until the distribution function is converged by the average values and the dispersion values.

After the calculating of the sound source values (S410), the sound sources are separated from the multi-channel audio signals based on the membership probabilities for each model of the sound sources by the calculation (separating the sound sources (S420)). Meanwhile, the separating of the sound sources (S420) may separate the sound sources from the multi-channel audio signals based on the channel distribution values.

In the present exemplary embodiment, prior to the determining of the parameters (S400), acquiring the parameters, estimating the sound source values, and reflecting the sound source values may be performed. The acquiring of the parameters acquires parameters for the predetermined sound sources. The estimating of the sound source values estimates the channel distribution values of the corresponding sound sources by using the acquired parameters. The reflecting of the sound source values reflects the estimated channel distribution values when estimating the mixture model and when calculating the membership probability for each model.

The estimating of the sound source values may be configured to include the calculating of the parameters and the estimating of the channel distribution values. The calculating of the parameter calculates the average values of each parameter on the normal distribution predicted by the acquired parameters and calculates the dispersion values or the standard deviation values of each parameter. The estimating of the channel distribution values estimates the channel distribution values of the corresponding sound sources using the values obtained for each parameter by the calculation.

The reflecting of the sound source values may reflect the prestored channel distribution values when the estimated channel distribution values are absent.

The exemplary embodiments of the present invention relate to the apparatus and method for separating the sound sources using the channel distributions of the sound sources and can be applied to music contents service fields.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for separating sound sources, comprising:

a parameter determinator determining parameters associated with interchannel correlation for each sound source included in receiving multi-channel audio signals;

a sound source value calculator using channel distribution values of the each sound source by the parameters to estimate at least one mixture model and calculating membership probabilities for each model for the each sound source from the at least one estimated mixture model;

a sound source separator separating the each sound source from the multi-channel audio signals based on the membership probabilities calculated for the each model of the each sound source;

a parameter acquisition unit acquiring the parameters for predetermined sound sources;

a sound source value estimator estimating the channel distribution values of the each corresponding sound source by using the acquired parameters; and a sound source value reflector reflecting the estimated channel distribution values when estimating the at least one mixture model and when calculating the membership probabilities.

2. The apparatus of claim 1, wherein the sound source value calculator estimates a Gaussian mixture model using the at least one mixture model to calculate the membership probabilities according to expectation maximization.

3. The apparatus of claim 2, wherein when A is a contribution probability of contributing a first mixture model associated with a selected parameter to each of the at least one mixture model, B is a probability of generating a selected data sample by the first mixture model, and C is a sigma operation value for a multiplication value of A and B that use each mixture model as the first mixture model when the each of the at least one mixture model is at least two, the sound source value calculator calculates a value obtained by dividing a multiplication value of A and B by C as an expectation.

4. The apparatus of claim 3, wherein the sound source value calculator performs the expectation maximization using average values of each data sample reflecting the calculated expectations and dispersion values of all the data samples reflecting the calculated expectations and the average values to calculate the mixture probabilities.

5. The apparatus of claim 4, wherein the sound source value calculator repeatedly performs the expectation maximization until the distribution function is converged by the average values and the dispersion values.

6. The apparatus of claim 1, wherein the parameter determinator includes:

a signal extractor extracting signals including the predetermined sound sources by transforming multi-channel audio signals from a time domain into a frequency domain or extract the signals including the predetermined sound sources by filtering the multi-channel audio signals; and a matrix calculator configuring extracted signals in a spectrogram matrix and determining the parameters by calculating the spectrogram matrix for elements having specified frames or frequency values.

7. The apparatus of claim 1, wherein the sound source separator separates the sound sources from the multi-channel audio signals based on the channel distribution values.

8. The apparatus of claim 1, wherein the sound source value estimator includes:

a parameter calculator calculating the average values of each parameter on a normal distribution predicted by the acquired parameters and calculating dispersion values or standard deviation values of each parameter; and a channel distribution value estimator estimating the channel distribution values of the corresponding sound sources using values obtained for each parameter by the calculation.

9. The apparatus of claim 1, wherein the sound source value reflector reflects the prestored channel distribution values when the estimated channel distribution values are absent.

10. A method for separating sound sources, comprising:

determining parameters associated with interchannel correlation for each sound source included in receiving multi-channel audio signals;

using channel distribution values of the each sound source by the parameters to estimate at least one mixture model and calculating membership probabilities for each model for the each sound source from the at least one estimated mixture model;

separating the each sound source from the multi-channel audio signals based on the membership probabilities calculated for the each model of the each sound source;

acquiring the parameters for predetermined sound sources;

estimating the channel distribution values of the each corresponding sound source by using the acquired parameters; and reflecting the estimated channel distribution values when estimating t e at least one mixture model and when calculating the membership probabilities.

11. The method of claim 10, wherein the calculating of the sound source values estimates a Gaussian mixture model using the at least one mixture model to calculate the membership probabilities according to expectation maximization.

12. The method of claim 11, wherein when A is a contribution probability of contributing a first mixture model associated with a selected parameter to each of the at least one mixture model, B is a probability of generating a selected data sample by the first mixture model, and C is a sigma operation value for a multiplication value of A and B that use each mixture model as the first mixture model when the each of the at least one mixture model is at least two, the calculating of the sound source values calculates a value obtained by dividing a multiplication value of A and B by C as an expectation.

13. The method of claim 12, wherein the calculating of the sound source value performs the expectation maximization using average values of each data sample reflecting the calculated expectations and dispersion values of all the data samples reflecting the calculated expectations and the average values to calculate the mixture probabilities.

14. The method of claim 13, wherein the calculating of the sound source values repeatedly performs the expectation maximization until the distribution function is converged by the average values and the dispersion values.

15. The method of claim 10, wherein the determining of the parameters includes:

extracting signals including the predetermined sound sources by transforming multi-channel audio signals from a time domain into a frequency domain or extracting the signals including the predetermined sound sources by filtering the multi-channel audio signals; and configuring extracted signals in a spectrogram matrix and determining the parameters by calculating the spectrogram matrix for elements having specified frames or frequency values.

16. The method of claim 10, wherein the separating of the sound sources separates the sound sources from the multichannel audio signals based on the channel distribution values.

17. The method of claim 10, wherein the estimating of the sound source values includes:

calculating the average values of each parameter on a normal distribution predicted by the acquired parameters and calculating dispersion values or standard deviation values of each parameter; and estimating the channel distribution values of the corresponding sound sources using values obtained for each parameter by the calculation.

18. The method of claim 10, wherein the reflecting of the sound source values reflects the prestored channel distribution values when the estimated channel distribution values are absent.

* * * * *